SR 3
OR 3,469,120 18
SEARCH ROOM
Sept. 23, 1969 MORIMASA NAGAO ET AL 3,469,120
PIEZOELECTRIC ELECTROACOUSTIC TRANSDUCER
Filed Dec. 19, 1966
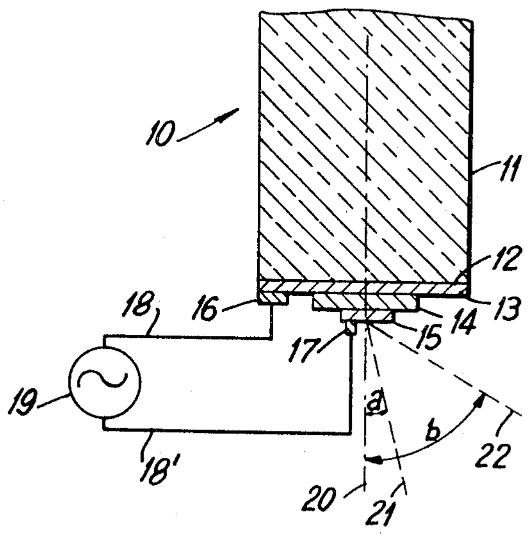
INVENTORS
MORIMASA NAGAO
NAOTAKA SAKAKIBARA
BY Hopgood & Calimafde
ATTORNEYS United States Patent Office 3,469,120
Patented Sept. 23, 1969

3,469,120

PIEZOELECTRIC ELECTROACOUSTIC TRANSDUCER

Morimasa Nagao and Naotaka Sakakibara, Tokyo, Japan, assignors to Nippon Electric Company Limited, Tokyo, Japan, a corporation of Japan Filed Dec. 19, 1966, Ser. No. 602,804
Claims priority, application Japan, Dec. 21, 1965, 40/78,768
Int. Cl. H02n *1/06*; H03h *7/30*; H04r *17/00*
U.S. Cl. 310—9.5 4 Claims

ABSTRACT OF THE DISCLOSURE

A piezoelectric transducer is described for operation at very high acoustic frequencies. The high operating frequencies are obtained by controlling the crystalline axes of both the piezoelectric material and an underlying electrode layer. In a preferred embodiment, an aluminum electrode layer is deposited on the surface of an acoustic load and formed thereon with a crystalline axis at an oblique angle with the load surface. The piezoelectric material which is preferably made of cadmium sulfide, is formed over the electrode layer with its C axis aligned at an angle with the load surface. A selective control of both angles within a preferred range has been found to yield a transducer capable of operating at a frequency as high as 150 mHz.

This invention relates to transducers and, more particularly, to piezoelectric electroacoustic transducers which may be used, for example, in ultrasonic delay lines or in ultrasonic amplifiers. Still more particularly, this invention relates to piezoelectric electroacoustic transducers having fundamental resonant frequencies within the range extending from 50 to 2,000 megacycles per second (mHz.).

An electroacoustic transducer of the piezoelectric type, for example, which is to have its ultrasonic fundamental frequency in the high frequency region should preferably be very thin. Therefore, such a piezoelectric member would usually be manufactured either by epitaxial growth or by vacuum evaporation. If epitaxial growth is employed in manufacture of the device, it is ordinarily desirable to select both the substrate and the piezoelectric material so they have similar and appropriately related crystal structures and lattice constants; and it is also important to control the orientation of the crystal axes of the piezoelectric material so as to produce a piezoelectric member having the desired mode of vibration. The qualities desired of the substrate, and therefore the restrictions imposed upon the substrate, introduce drawbacks such that the substrate may not necessarily be suitable as an acoustic load nor serviceable as a ground electrode. Furthermore, the attachment of the acoustic load to the substrate generally results in an increase in the transmission loss of the piezoelectric electroacoustic transducer and consequently reduces the efficiency of the transducer. On the other hand, if vacuum evaporation is adopted in the manufacture of the transducer, it is possible, indeed it is feasible, to produce a suitable transducer by forming a layer of conductive material directly on the acoustic load and then in turn superimposing a piezoelectric member on the layer of the conductive material. It has been considered difficult with the latter process, however, to produce a transducer having the desired mode of vibration and having, at the same time, very high efficiency because it is usually impossible to control the orientation of the crystal axes of the piezoelectric member to be grown and applied to the conductive layer.

One of the objects of this invention, therefore, is to provide a piezoelectric electroacoustic transducer which is made, for example, by vacuum evaporation and has its fundamental vibratory frequency in a range between 50 and 2,000 megacycles per second (mHz.), and which can assume at high efficiency such a mode of vibration as has heretofore been unattainable with any appreciable measure of efficiency.

The instant invention is featured by the control of the orientation of the axes of the electrode materials which are deposited on an acoustic load, and this is accomplished by having certain of the crystal axes of the piezoelectric materials deposited on the electrode materials in desired respective directions. This invention is based upon applicants' discovery that the orientations of the crystal axes are made possible through vacuum evaporation of the ground electrode and the piezoelectric materials, both at oblique incidence.

In accordance with this invention, materials and methods of manufacture will be described making practicable the construction of a piezoelectric acoustic transducer capable of assuming such a mode of vibration as has hitherto been unattainable with any measure of efficiency and at the same time to widen the field of application of such a transducer.

This invention will be better understood from the more detailed description of the device or devices constituting the embodiments of this invention and of the methods of making the devices of this invention, by reference to the accompanying drawing which shows a longitudinal section of a piezoelectric electroacoustic transducer made according to this invention. This drawing of the transducer is given here merely for illustration.

Referring to the drawing, the piezoelectric electroacoustic transducer of this invention is designated 10. It comprises an acoustic load 11; an electrode 13 which is laid on a surface 12 of the load 11 (and is sometimes called a "ground electrode"); a layer 14 of piezoelectric material formed on the ground electrode 13 by, for example, vacuum evaporation; and a complementary electrode 15 which is positioned opposite electrode 13, the layer 14 separating the electrodes 13 and 15. The electrodes 13 and 15 have contacts 16 and 17, respectively, which are connected by lead wires 18 and 18', respectively, to an alternating current source 19. In the particular embodiment shown, the acoustic load 11, the ground electrode 13, and the layer 14 which is of piezoelectric material, are preferably made of fused quartz, aluminum, and cadmium sulfide, respectively. The complementary electrode 15 is preferably a thin vacuum-evaporated coating of gold of appropriate thickness.

The vacuum-evaporated layer 14 of piezoelectric material, consisting of cadmium sulfide, is preferably composed of microcrystals of the hexagonal system. It is desirable to arrange all of the C axes of the cadmium sulfide microcrystals in a direction perpendicular to the surface 12 of acoustic load 11 and in a certain direction parallel to the surface 12, to produce longitudinal and shear vibrational modes, respectively. The inventors have also discovered, and confirmed by experiment, that it is possible to provide an efficient transducer even if all of the C axes of the microcrystals are not entirely perpendicular or parallel to the surface 12 but are inclined with respect to the surface 12. But in any particular case, all of the C axes should be aligned in one and the same direction. If the piezoelectric material is composed of microcrystals of other than the hexagonal system, one of the other crystal axes of each microcrystal should also be aligned in a given direction, whereupon the straight lines perpendicular to the surface 12 have one and the same, or an equivalent set of Miller indices for the microcrystals.

Conventionally, vacuum evaporation of aluminum and cadmium sulfide has been carried out along a normal direction 20, referred to in the drawing, with respect to the surface 12 of the acoustic load 11. By means of a vacuum evaporation, both the (111) axes or the equivalent axes of the aluminum microcrystals forming the ground electrode 13 and the C axes of the cadmium sulfide microcrystals of layer 14 are oriented in a direction perpendicular to the surface 12. So long as vacuum evaporation takes place along the normal 20, the C axes of the cadmium sulfide layer 14 lie in this perpendicular direction whatever the material for the substrate may be. This is convenient for production of a piezoelectric electroacoustic transducer for use in vibration in its longitudinal mode, but it is difficult to manufacture an efficient transducer for producing vibration in its shear mode.

However, it has now been found possible to overcome the difficulty by performing the vacuum evaporation at what is called, and is herein defined, as "oblique incidence." This will be first explained wherein the cadmium sulfide layer 14 is alone subjected to vacuum evaporation at oblique incidence. If cadmium sulfide undergoes vacuum evaporation at oblique incidence in a direction 21 forming, for example, an angle *a* with the normal 20 to the surface 12 of the acoustic load 11, the C axes of the cadmium sulfide microcrystals in the layer 14 are aligned obliquely to the normal 20 at the angle *a*. According to the discovery and experiments of the applicants, it has been confirmed that the directions of the C axes of the microcrystals differ from the direction of the normal 20 and have deviations to a considerable extent. It has thus proved that this method, i.e., vacuum evaporation at oblique incidence, renders it possible to manufacture an electroacoustic transducer capable of assuming a shear mode of vibration but this method and arrangement make it difficult to manufacture a sufficiently effective transducer for use in the shear mode of vibration.

Let us now consider the case wherein not only the cadmium sulfide layer 14 but also the aluminum electrode 13 are both formed by vacuum evaporation at oblique incidence. If aluminum is subjected to vacuum evaporation at oblique incidence, for example, in a direction 22 forming an angle *b* with respect to the normal direction 20 and then the cadmium sulfide layer 14 is also subjected to vacuum evaporation at obliqe incidence in the above-mentioned direction 21, it has been confirmed through experiments performed by these applicants that almost all of the cadmium sulfide microcrystals of the layer 14 have their C axes in a given direction forming a certain angle with the normal 20 and that they form a straight line parallel to the normal 20 with a given set or an equivalent set of Miller indices. It is considered by applicants that the aluminum electrode 13, which has been formed through vacuum evaporation at obliqe incidence and which has inclined crystal axes and a rough and undulating surface, causes almost all of C axes of the microcrystals of cadmium sulfide 14 to align in one and the same direction. Therefore, in this modified arrangement, the cadmium sulfide layer 14 is now suitable for use as a component of an electroacoustic transducer having high efficiency for vibration in the shear mode.

The aluminum layer 13 obtained through vacuum evaporation at oblique incidence as above noted has its (111) axes inclined with respect to the normal 20. This obliqueness of the (111) axes of the aluminum layer 13 is presumably the reason for establishing and re-orienting the crystal axes of the cadmium sulfide layer 14 in the indicated order. The angles *a* and *b* may optionally be selected from a range extending from 0° to 90°. Greater values within this range for the angles *a* and *b* would give better results except for the fact that such angles are not suitable to produce layers of the materials of 13 and 14 of the desired respective thicknesses. It follows, therefore, that an angle of approximately 50° to 70° would be optimum for both angles *a* and *b*. It has been confirmed, furthermore, that the same angle of approximately 60° is most favorable for both angles *a* and *b* during fabrication of a piezoelectric electroacoustic transducer having fundamental resonant frequencies within a range extending from 50 to 150 megacycles per second (mHz) and that the angles of approximately 70° and 60° are most favorable for angles *b* and *a*, respectively, during the fabrication of a transducer having fundamental resonant frequencies more than 150 megacycles per second.

The cadmium sulfide layer 14 must not only have controlled orientation of the crystal axes as above mentioned so as to produce vibration in the desired mode, but it should also have sufficiently high resistivity so that an electric voltage impressed across it may result in a sufficiently strong and therefore an efficient piezoelectric effect. The cadmium sulfide layer 14 formed through vacuum evaporation, however, has fairly low resistivity in general. In order to raise its resistivity, heat treatment of the cadmium sulfide layer in a sulfur atmosphere will be employed in accordance with this invention, among other various treatments to be disclosed.

A more detailed manner of manufacture will now be disclosed for one form of piezoelectric electroacoustic transducer to be made according to this invention. A fused quartz acoustic load 11 is placed so that the vacuum evaporation to be performed may take place along the direction 22 for which the angle *b* may have its optimum value of, for example, 60°. Aluminum is then vacuum-evaporated onto the surface 12 of the acoustic load 11. At this stage, it is preferable that the vacuum be better than $10^{-5}$ torr, that the temperature of the fused quartz be below 100° C., and that the aluminum layer 13 be thicker than 3,000 angstroms. With the fused quartz 11 disposed at this angle *b*, cadmium sulfide is now evaporated onto the aluminum layer 13 in a vacuum better than $5 \times 10^{-5}$ torr. During the evaporation, the fused quartz should be kept within a temperature range between 120° C. and 200° C., because cadmium sulfide does not generally attach to a body at a temperature above 200° C. and because a cadmium sulfide layer 14 formed on the aluminum layer 13 at a temperature below 120° C. does not provide an excellent contact with the aluminum layer 13. In order to obtain a piezoelectric electroacoustic transducer capable of operating in the desired frequency range as already suggested above, the layer 14 should have a thickness somewhere between 0.5 micron and 18 microns. The source for evaporation of cadmium sulfide should be kept at any temperature between 650° C. and 1,000° C., because evaporation of cadmium sulfide takes place too rapidly at a temperature above 1,000° C. and very slowly at a temperature below 650° C. The fused quartz 11 and its layers 13 and 14 are sealed together with an additive of sulfur in a vacuum envelope made preferably of fused quartz or hard glass, with the fused quartz load 11 disposed at one end of the envelope and the sulfur at the other end. The envelope is then placed within a two-stage furnace for keeping the fused quartz 11 within a temperature range between 200° C. and 450° C. and the sulfur additive within a temperature range of from 20° C. to 100° C. lower. The cadmium sulfide layer 14 is thus heat-treated in the sulfur atmosphere. For a thicker layer 14, it is necessary to perform the heat treatment at higher temperatures and for longer time. Temperatures above 450° C. would be objectionable, however, because of the reaction between the layers 13 and 14 within the envelope. Temperatures below 200° C. give very poor results in the heat treatment. A sufficient amount of sulfur should be placed in the envelope so that all of the sulfur may not be vaporized during the heat treatment. The heat treatment raises the resisitivity of cadmium sulfide layer to above 10 MΩ cm. After heat-treating of the cadmium sulfide layer, gold may then be attached by the usual vacuum evaporation process to form the complementary electrode 15 of a thickness preferably exceeding 3,000 angstroms.

The piezoelectric electroacoustic transducer 10 so obtained efficiently produces vibration in the shear mode and has less than 15 db insertion loss at its resonance frequency. Although the transducer assumes also some vibration along the longitudinal mode, the longitudinal vibratory mode is not significant because the insertion loss for the longitudinal vibratory mode is greater by more than 30 db than the insertion loss for the shear mode at the resonance frequency for the shear mode.

Another embodiment of an electroacoustic transducer of this invention and its method of manufacture will now be described. Onto a surface of 8 mm. x 8 mm. of a fused quartz rectangular parallelepiped of 8 mm. x 8 mm. x 10 mm. serving as an acoustic load 11, an aluminum layer 13 of a thickness of 3,500 A. is vacuum-evaporated in a vacuum of $10^{-5}$ torr. The angle *b* is preferably set at 60°. The fused quartz 11 having the layer 13 is now degassed in a vacuum at 400° C. for fifteen minutes. The temperature of the fused quartz is then lowered down to 150° C., and a cadmium sulfide layer 14 is then vacuum-evaporated onto the layer 13 in a vacuum of $5 \times 10^{-6}$ torr. The angle *a* is also set preferably at 60°. The source of cadmium sulfide for evaporation is made of a powder which is formed into pellets under a pressure of between 1 and 2 tons/cm.$^2$. The mass is about 0.5 gram per pellet. Six such pellets are put into a tungsten helical coil heater which is coated with alumina and is 2 cm. in diameter and 1 cm. in depth and which is placed 10 cm. apart from the fused quartz 11. The temperature of the coil heater is raised to 900° C. to vaporize the cadmium sulfide. Almost all of the microcrystals of the cadmium sulfide layer 14 will then have their C axes lying in a direction forming about 32° with the normal 20 and their (103) axes extending parallel to the normal 20. The fused quartz 11 having the layers 13 and 14 and about 0.5 gram of sulfur are sealed in a vacuum envelope of fused quartz and treated for about five hours in a two-stage furnace at the respective temperatures of 400° C. and 350° C. This heat treatment raises the resistivity of the cadmium sulfide layer 14 to above 10 MΩ cm. After the latter heat treatment, gold is vacuum-evaporated at room temperature onto the cadmium sulfide layer 14 to a thickness of 3,000 A. The piezoelectric electroacoustic transducer so obtained assumes a shear mode of vibration and has its resonance frequency at 130 megacycles per second (mHz.) and an insertion loss of 13 db.

The characterizing features of the electroacoustic transducer according to this invention are as follows:

(1) The surface of the ground electrode 13 of aluminum has roughness and undulation. Further, its crystal axes are exposed upon said surface which do not appear there when the electrode is formed through vacuum evaporation at perpendicular incidence.

(2) Microcrystals of piezoelectric material, when they are of the hexagonal system, such as ZnO, CdS, or ZnS, have their C axes aligned in one inclined direction, while the other corresponding crystal axes may not necessarily be parallel to one another. When the microcrystals are of the tetragonal or of the rhombic system, the corresponding ones of the crystal axes thereof are disposed in one inclined direction and the other corresponding ones of said crystal axes are parallel to one another.

As is explained hereinabove, these features are the results obtainable from vacuum evaporation at oblique incidence during formation of both of the ground electrode 13 and the layer of piezoelectric material 14.

In each of the examples so far described, fused quartz has been used as an acoustic load 11. The acoustic load 11 may, however, be made of any other material, such as glass, rock crystal, ruby, cadmium sulfide, or the like, that withstands the temperature of the heat treatment and does not react with the material of which the electrode 13 is made, Also, the electrode 13 need not be made of aluminum but may be made of any other metal that warrantedly interlinks the acoustic load 11 with the layer 14 of piezoelectric material up to the desired temperature range for heat treatment and does not react unfavorably with any of the materials required to produce the transducer. Furthermore, the electrode 13 may not necessarily be formed of a single layer but may be composed of a plurality of layers of different metals. Gold or other metal may be employed as the contact 16 formed on the electrode 13 to improve the electrical connection. As for the layer 14 of the piezoelectric material, zinc sulfide or any other II–VI-group compound may be substituted for cadmium sulfide.

As has so far been explained, the technical scope of this invention is not limited by the particular embodiments and the examples and methods of production given above, but covers all piezoelectric acoustic transducers, such as are within the scope of the disclosure and claims.

While this invention has been described with respect to certain particular embodiments and with respect to certain particular methods and processes of manufacture merely for illustrative purposes, it will be apparent that this invention may be also applied to many other embodiments and may be manufactured by many other methods and processes, without departing from the spirit of the invention and the scope of the appended claims.

What is claimed is:

1. A piezoelectric transducer comprising an acoustic load substrate having a surface for receiving a piezoelectric transducer, a first metallic electrode layer formed on said surface with the 111 plane of said layer aligned at an oblique angle with the substrate surface, a layer of piezoelectric material formed on said metallic electrode with its crystalline C axis at an oblique angle with the substrate surface, and a second electrode layer formed over said piezoelectric material layer.

2. A transducer according to claim 1 in which the oblique incidence of the first electrode layer and the piezoelectrical material are at an angle which ranges from 40° to 20° with respect to the surface of said substrate.

3. The device as recited in claim 2 wherein the first metallic electrode layer is formed of aluminum and the piezoelectric material is formed of cadmium sulfide.

4. The device as recited in claim 2 wherein said oblique angle for both the first electrode layer and the piezoelectric material is approximately 30°.

References Cited

UNITED STATES PATENTS

| | | | |
|---|---|---|---|
| 3,012,211 | 12/1961 | Mason | 333—30 |
| 3,254,231 | 5/1966 | Gandhi | 333—30 |
| 3,240,962 | 3/1966 | White | 310—9.5 |
| 3,388,002 | 6/1968 | Foster | 340—10 |
| 3,311,854 | 3/1967 | Mason | 310—9.5 |

J. D. MILLER, Primary Examiner

U.S. Cl. X.R.

29—25.35; 117—217; 310—8.5, 9.6; 333—30